(12) United States Patent
Kim et al.

(10) Patent No.: US 7,198,654 B1
(45) Date of Patent: Apr. 3, 2007

(54) SEPARATOR SHEET AND METHOD FOR MANUFACTURING ELECTRIC DOUBLE LAYER CAPACITOR USING THE SAME

(75) Inventors: Kang Yoon Kim, Chungcheongbuk-do (KR); Sang Gon Lee, Chungcheongbuk-do (KR); Young Kee Seo, Chungcheongbuk-do (KR); Jung Hoon Lee, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/312,375

(22) Filed: Dec. 21, 2005

(30) Foreign Application Priority Data
Oct. 13, 2005 (KR) ............... 10-2005-0096543

(51) Int. Cl.
*H01G 9/00* (2006.01)

(52) U.S. Cl. ............... 29/25.03; 361/502; 361/503; 361/504; 257/E21.011

(58) Field of Classification Search ............ None
See application file for complete search history.

(56) References Cited

U.S. PATENT DOCUMENTS

| | | | |
|---|---|---|---|
| 5,103,379 A * | 4/1992 | Kurabayashi et al. | 361/502 |
| 6,625,007 B2 * | 9/2003 | Sakata et al. | 361/502 |
| 2003/0147201 A1 * | 8/2003 | Nakazawa et al. | 361/502 |

* cited by examiner

Primary Examiner—Walter Lindsay, Jr.
Assistant Examiner—Cheung Lee
(74) Attorney, Agent, or Firm—Birch, Stewart, Kolasch & Birch, LLP

(57) ABSTRACT

A separator sheet for manufacturing an electric double layer capacitor, and a method for manufacturing the electric double layer capacitor using the same, are provided. According to an embodiment, the separator sheet for manufacturing the electric double layer capacitor comprises: a plurality of separators; and a resin film holding the plurality of separators, wherein the separators are disposed in the resin film at a predetermined interval.

8 Claims, 6 Drawing Sheets

FIG. 3A
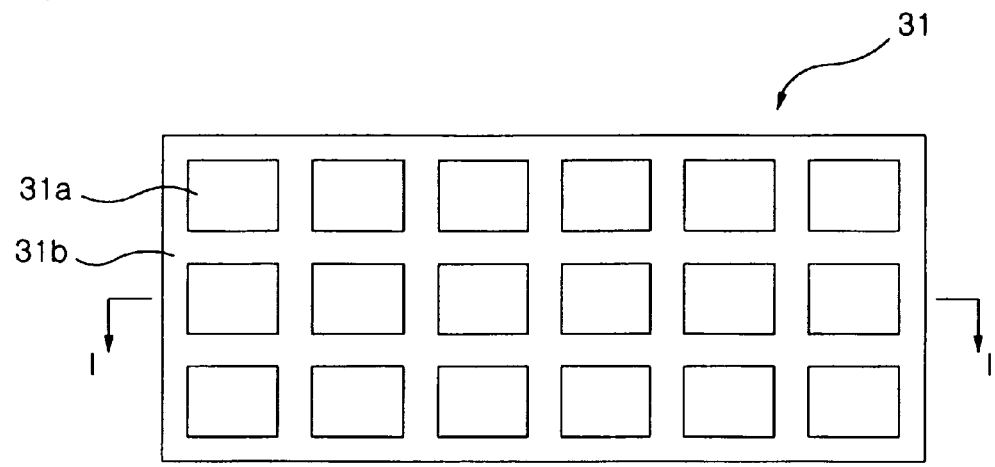
FIG. 3B
FIG. 4A
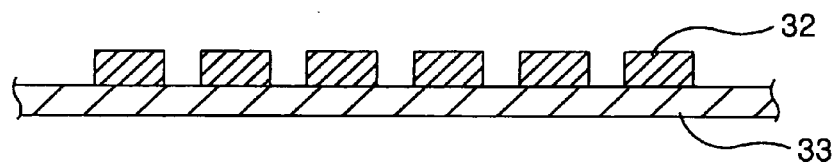
FIG. 4B
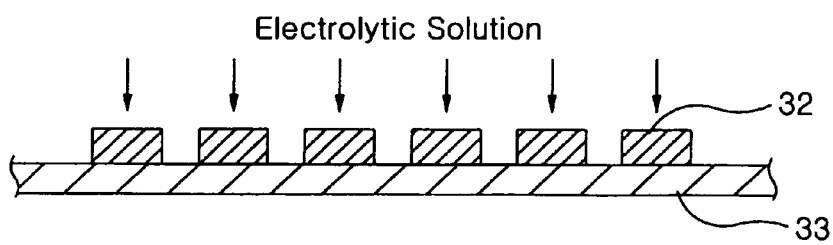

SEPARATOR SHEET AND METHOD FOR MANUFACTURING ELECTRIC DOUBLE LAYER CAPACITOR USING THE SAME

BACKGROUND OF THE INVENTION

1. Field of the Invention

The present invention relates to an electric double layer capacitor, particularly to a separator sheet used for manufacturing the electric double layer capacitor, and a method for manufacturing the same.

2. Description of the Related Art

The electric capacity of a conventional capacitor is generally determined by the dielectric constant of the dielectric material interposed between two oppositely disposed electrodes.

However, an electrical double layer capacitor has a different feature from conventional capacitors using dielectric material in that positive charge and negative charge are distributed with a considerably short distance around the interface between two different layers of a solid and a liquid.

The layer formed around the interface is referred to as Electric Double Layer, and the capacitor using it is classified as electric double layer capacitor.

For the solid of the electric double layer capacitor, it is preferable to use a material having large specific surface area so that more electric double layers are formed to obtain large capacity. Accordingly, activated carbon or activated fiber whose surface area is more than 1000 $m^2/g$, and diluted sulphuric acid, can be employed for the solid and the liquid, respectively, to result in a considerably higher capacity of F (Farad) level of capacitor than conventional capacitor.

The electric double layer capacitor has intermediate characteristics between an electrolytic capacitor and a secondary battery, and is an energy storage device that has high efficiency, excellent durability, and fast charge/discharge ability. Thus, the electric double layer capacitor may be used in combination with a conventional secondary battery, or be a substitutable energy storage device for it.

In addition, the electric double layer capacitor can input/output energy within a short time, and thus may be used for rectifier circuit, noise attenuation, and pulse generation for power supply unit. Moreover, the capacitor's capacitance is highly increased, compared with other electric chemical condenser, and so the electric double layer capacitor has high output of pulse power capacity and high energy storage capacity. Thus, the electric double layer capacitor may be applicable for a compact electrochemical energy storage device and load leveling of high output of pulse power and peak power.

Further, the electric double layer capacitor has been more important environmentally and economically among other energy storage devices in that it uses environmentally friendly materials, and has long life span and high charge/discharge efficiency. This electric double layer is expected to be used for a main power supply source and an auxiliary power supply source of high output of pulse power for highly value added equipments in various technical fields such as military defense, aerospace, medical equipment, HEV, etc.

FIG. 1A is a cross-sectional view of a conventional electric double layer capacitor, illustrating a schematic structure of the electric double layer capacitor, and FIG. 1B is a schematic view of the basic cell illustrated in FIG. 1A.

Referring to FIG. 1A, an electric double layer capacitor 1 comprises at least one basic cell 10. Here, the multilayer cell 20 manufactured by stacking 5 basic cells 10 in series is illustrated. An electrode plate 21 with its lead terminal is attached to outer surface of the basic cells 10 disposed in the outermost positions, and an outer package 22 is covering the electrode plate 21. The packaging is performed under pressure reduced condition.

The lead terminal attached to the electrode plate 21 is made by doing solder plating on the surface of copper plate, and made up of a flat electrode plate body 24 and a band-shaped lead terminal 25 extended from the electrode plate body 24, wherein the electrode plate body 24 is bonded to the outer surface of the outermost basic cells 10 of the multilayer cell 20.

Referring to FIG. 1B, the basic cell 10 comprises a porous separator 11 in the form of a sheet; a pair of current collector films 12 oppositely disposed relatively to the separator 11; a pair of polarized electrodes 13 disposed between the separator 1 and the current collect films 12; and a frame form of gasket 14 which is laterally contiguous to the separator 11 and the polarized electrodes 13 and interposed between the pair of current collector films 12. The basic cell 10 is sealed with an electrolytic solution therein.

The steps for manufacturing the basic cell 10 are described with reference to FIG. 2 below.

FIG. 2 is a view illustrating some of the steps for manufacturing an electric double layer capacitor.

As shown in FIG. 2(a), a current collector film 12 is prepared, and cut to be a certain size as shown in FIG. 2(b). The current collector film 12 is a conductive film made up of an insulation resin and a conductive material.

Next, as shown in FIG. 2(c), a frame form of gasket 14 is installed on the surface of the current collector film 12. As the gasket 14 is positioned at the edge of the current collector film 12, a portion of the current collector film 12 is exposed inside the gasket 14.

Next, as shown in FIG. 2(d), a polarized electrode 13 is formed on the surface of the exposed current collector film 12, and as shown in FIG. 2(e), a separator 11 is disposed to cover inside of the gasket.

Next, as shown in FIG. 2(f), two intermediate structures formed from FIG. 2(a) to FIG. 2(d) are oppositely disposed with having the separator 11 in between.

Finally, the structure shown in FIG. 2(f) is thermo-compressed for the gaskets 14 to be thermally fusion-bonded to each other, to complete the basic cell shown in FIG. 2(g).

However, in case that basic cell array including a plurality of basic cells is produced from one current collector film, there is a difficult problem that a plurality of separators should be aligned precisely on each corresponding gasket. Therefore, there has been a need to develop a method to dispose the separators easily and precisely on their respective gaskets.

SUMMARY OF THE INVENTION

An object of the present invention is to provide a separator sheet, and a method for manufacturing an electric double layer capacitor which can easily and precisely dispose a plurality of separators at their respective position.

The separator sheet according to a preferable embodiment of the present invention comprises a plurality of separators; and a resin film holding the plurality of separators, wherein the separators are disposed in the resin film at a predetermined interval.

The method for manufacturing an electric double layer capacitor according to a preferable embodiment of the present invention comprises: (a) forming a plurality of polarized electrodes on a current collector film; (b) installing a gasket element around each polarized electrode; (c) installing the above described separator sheet on the gasket element; (d) oppositely disposing two intermediate structures prepared by the process including the steps (a) and (b) with interposing a separator sheet between the two structures; and (e) thermally fusion-bonding the gasket elements with the resin film of the separator sheet to unite two intermediate structures.

BRIEF DESCRIPTION OF THE DRAWINGS

The present invention will be more clearly understood from the detailed description in conjunction with the following drawings.

FIG. 3A is a plane view of the separator sheet according to a preferable embodiment of the present invention;

FIG. 3B is a cross-sectional view of the separator sheet of FIG. 3A as taken along the line I—I.

DETAILED DESCRIPTION OF THE INVENTION

Figure 1A:
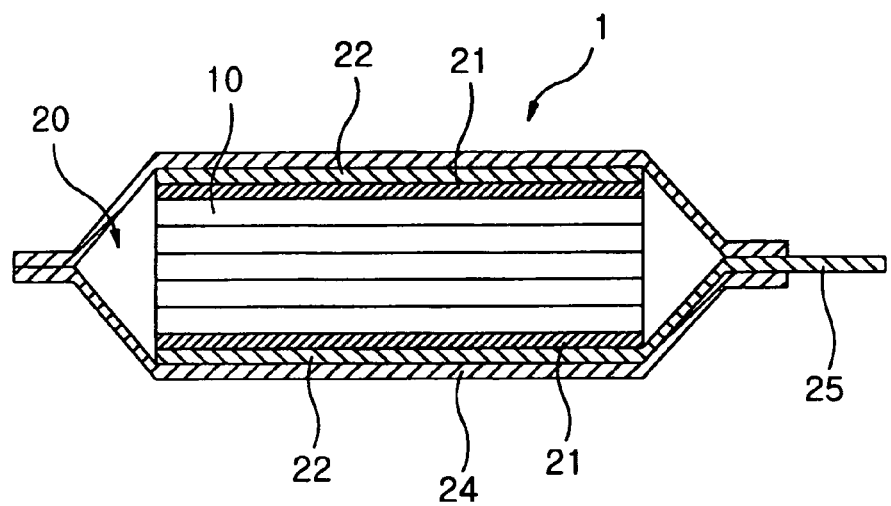
FIG. 1A is a cross-sectional view of an electric double layer capacitor, illustrating a schematic structure of the electric double layer capacitor.
Figure 1B:
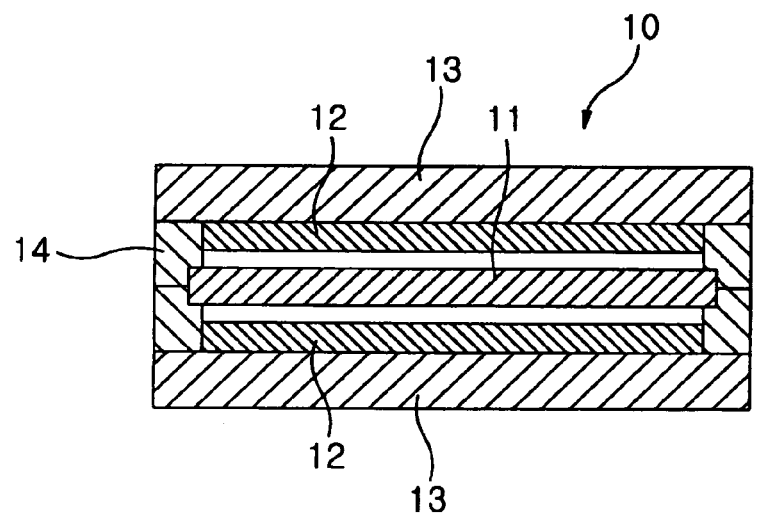
FIG. 1B is a schematic view of the basic cell illustrated in FIG. 1A.
Figure 2A:
FIG. 2 is a view illustrating some of the steps for manufacturing an electric double layer capacitor.
Figure 2B:
Figure 2C:
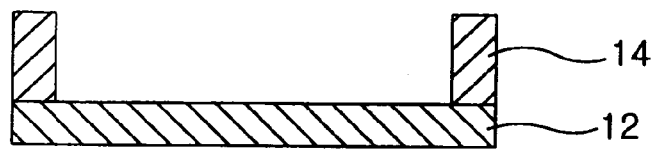
Figure 2D:
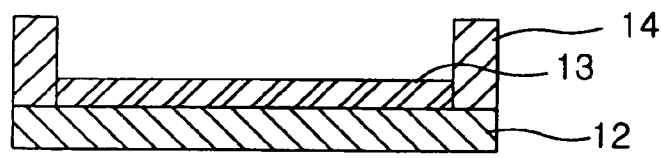
Figure 2E:
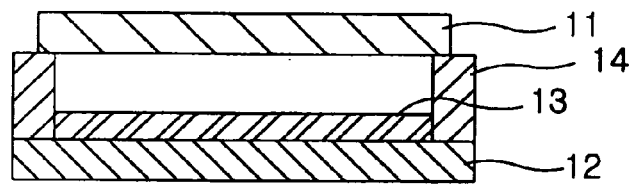
Figure 2F:
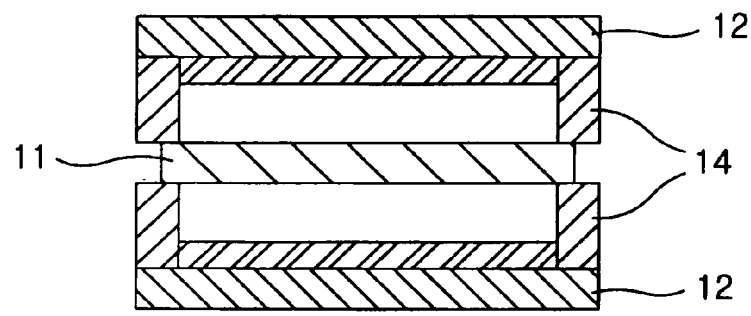
Figure 2G:
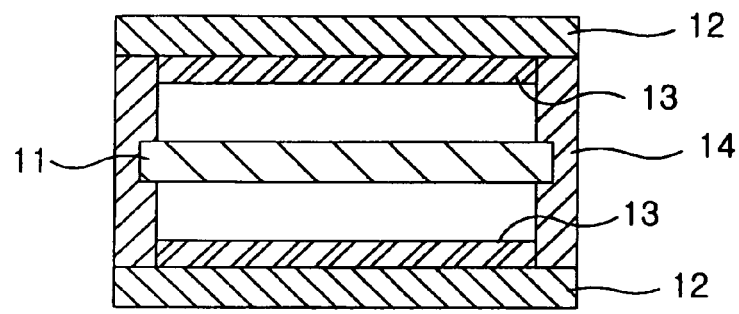

The present invention will be more clearly understood from the detailed description in conjunction with the following drawings.

FIG. 3A is a plane view of the separator sheet according to a preferable embodiment of the present invention; and FIG. 3B is a cross-sectional view of the separator sheet of FIG. 3A as taken along the line I—I.

Referring to FIG. 3A, the separator sheet 31 comprises a resin film 31b and a plurality of separators 31a that are disposed at a predetermined distance therein.

Advantageously, a porous film having ion permeability and non electroconductivity may be used as separator 31a, but not limited thereto. Such porous film is a form of sheet, for example, polypropylene, polyethylene, glass fiber, etc.

Referring to FIG. 3B, the separator sheet 31 is configured for each separator 31a to be held by the resin film 31b therein.

Advantageously, the resin film 31b of the separator sheet 31 may be made up of a material that can be fused with the gasket which will be described below, at the step of thermocompression, to block leakage of the electrolyte through the separator 31a after the thermocompression. A preferable material for the resin film 31b may be ABS, Isobutylene-Isoprene rubber, polyolefin-based resin, etc.

Advantageously, the separator 31a has same thickness as the resin film 31b.

Hereinafter, the method for manufacturing the electric double layer capacitor according to a preferable embodiment of the present invention will be described with reference to the accompanying drawings.

FIG. 4 is a view illustrating some of the steps illustrating the electric double layer capacitor according to a preferable embodiment of the present invention.

As shown in FIG. 4(a), a plurality of polarized electrodes 32 are formed on a current collect film 33. The polarized electrodes 32 may be formed by the steps comprising, for example, installing a mask (not shown) on the current collect film 33; forming a pattern by spraying a slurry prepared by blending a material constituting the polarized electrodes, for example, conductive particles, with a binder and a solvent, through openings formed in the mask; drying the pattern by heat flow; and thermocompressing the structure formed by the above steps, but not necessarily limited thereto, and various modification will be available to those skilled in the art.

The binder, a component of the polarized electrode 32, serves to improve cohesion of the conductive particles and adhesion between the polarized electrode 32 and the current collect film 33, and to reduce density of electrode (g/cm$^2$), and the contact resistance between components of the electrode 32 and the current collect film 33.

Carboxymethyl cellulose, polyvinyl alcohol, polyvinyl fluoride, polyvinyl pyrrolidone, methylcellulose, etc. may be used as the binder.

As conductive material, one or more from the group consisting of granular acetylene black, Super P Black, carbon black, activated carbon, hard carbon, soft carbon, graphite, metal powder (Al, Pt, Ni, Cu, Au, stainless steel, or an alloy including at least one metal aforementioned), or a powder produced by coating carbon black, activated carbon, hard carbon, soft carbon, or graphite may be used alone or in combination, but not limited thereto.

Preferably, the current collect film 33 is a conductive film made of stylene-ethylene-butylene-stylene copolymer resin, but not limited thereto.

After forming the polarized electrode 32 on the current collect film 33, as shown in FIG. 4(b), an electrolytic solution is impregnated into the polarized electrode 32 in vacuum. The electrolytic solution may be an aqueous electrolytic solution produced by dissolving sulfuric acid, potassium hydroxide, etc in water, or an organic electrolytic solution produced by dissolving quaternary ammonium as electrolyte in an organic solvent, for example, propylene carbonate. In this embodiment, the electrolytic solution is impregnated prior to installing a later described gasket 34, but may be impregnated after installing the gasket 34.

Figure 4C:
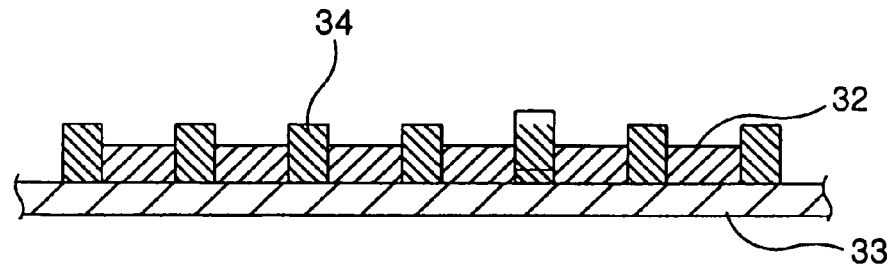
FIG. 4 is a view illustrating some of the steps illustrating the electric double layer capacitor according to a preferable embodiment of the present invention.

Next, as shown in FIG. 4(c), a gasket 34 in the form of frame, which is suitable for receiving the polarized electrode 32, is installed. The gasket 34 may be made up of, for example, ABS, Isobutylene-Isoprene rubber, or polyolefin-based resin, preferably, colorless and transparent polyolefin-based resin.

Figure 4D:
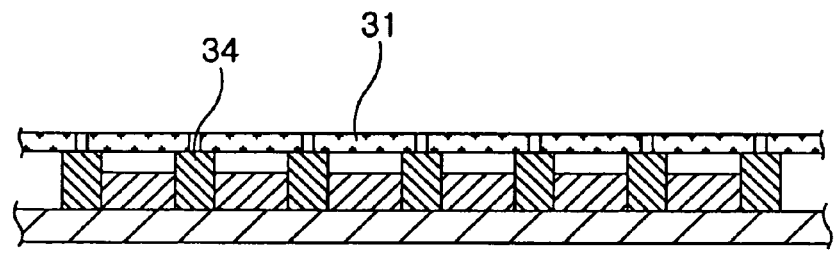

Next, as shown in FIG. 4(d), the above described separator sheet according to the present invention is disposed. Here, it is preferable that the resin film 31b disposed between the adjacent separators 31a is aligned along the upper surface of the gasket 34.

Figure 4E:
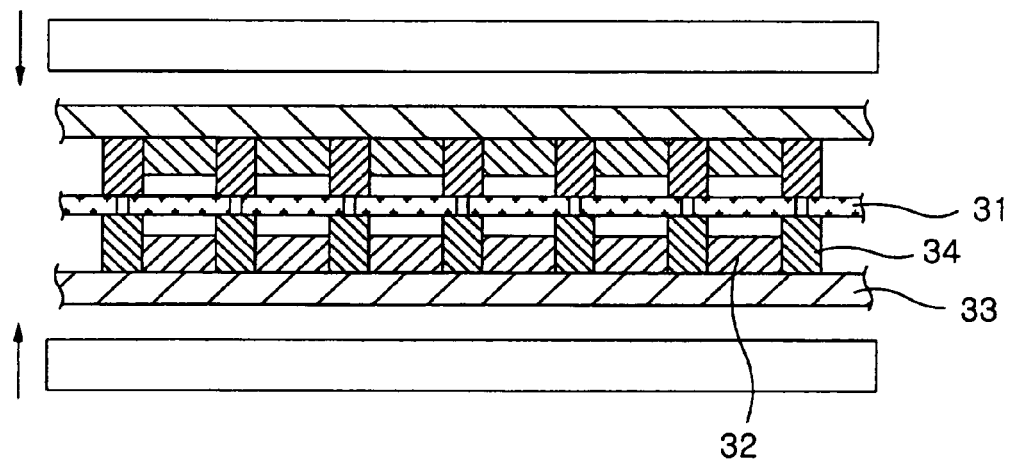
Figure 4F:
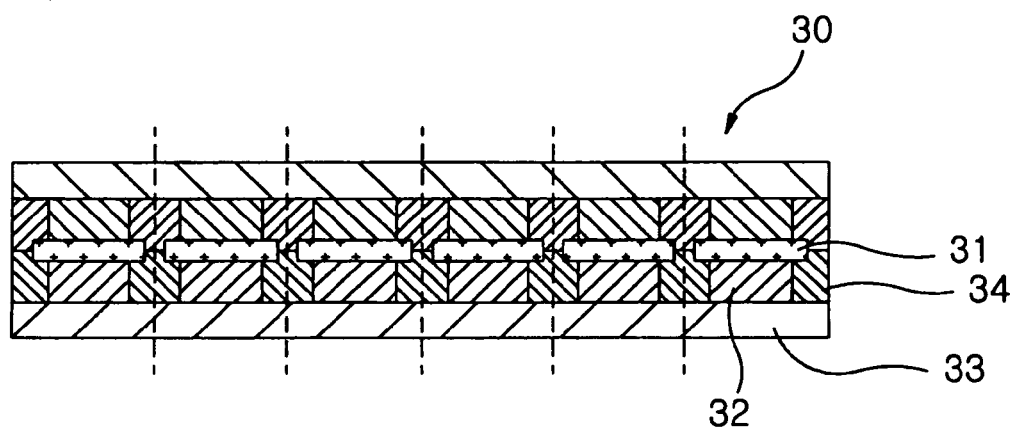

Next, as shown in FIG. 4(e), the two structures produced by the steps of FIG. 4(a) through FIG. 4(c) are oppositely disposed with having the separator sheet 31 in between, and are subjected to thermocompression in a longitudinal direction to thermally fusion-bond the oppositely disposed two gaskets 34 and the resin film 31b of the separator sheet 31, thereby producing the structural device as shown in FIG. 4(f). The thermally fusion-bonded area of the gaskets 34 and the resin film 31b of the separator sheet 31 can prevent leakage of the electrolytic solution through the separator 31.

Finally, the structure of FIG. 4(f) is cut along the dotted line between the adjacent separators to produce a plurality of basic cells 30.

Although not shown in the figure, the pluralities of basic cells 30 produced through the above steps are stacked in sequence, and then external electrodes are attached to the surface of the current collect films 31 of the basic cells 30 disposed in the outermost positions, and then packaged with an outer package to produce the present electric double layer capacitor.

The preferred embodiments of the present invention have been described for illustrative purposes, and those skilled in the art will appreciate that various modifications, additions, and substitutions are possible, without departing from the scope and spirit of the present invention as disclosed in the accompanying claims.

The present invention has an advantage that a plurality of separators may be disposed precisely to their respective positions in a single step in the process of manufacturing a plurality of basic cells to simplify the process and reduce the processing time.

What is claimed is:

1. A method of manufacturing an electric double layer capacitor, comprising:
    (a) forming a plurality of polarized electrodes on a current collector film;
    (b) installing a gasket element around each polarized electrode;
    (c) installing a separator sheet on the gasket element, the separator sheet comprising a plurality of separators and a resin film holding the separators, wherein the separators are disposed in the rein film at a predetermined interval;
    (d) oppositely disposing two intermediate structures prepared by the process including the steps (a) and (b) with interposing the separator sheet between the two intermediate structures; and
    (e) thermally fusion-bonding the gasket elements with the resin film of the separator sheet to unite the two intermediate structures.

2. The method of claim 1, further comprising:
    (a-1) impregnating the polarized electrodes with an electrolytic solution between the step (a) and the step (b).

3. The method of claim 1, further comprising:
    (b-1) impregnating the polarized electrodes with an electrolytic solution between the step (b) and the step (c).

4. The method of claim 1, wherein the current collector film is made up of a conductive resin film containing a carbon powder.

5. The method of claim 1, wherein in the step (c), the resin film is made up of thermoplastic resin.

6. The method of claim 5, wherein the plurality of separators in the separator sheet are made of a porous film having ion permeability and non electro-conductivity.

7. The method of claim 1, wherein in the steps (a) and (b), the plurality of polarized electrodes are formed on the current collector film first, and then the gasket element is installed around each of the plurality of polarized electrodes formed on the current collector film.

8. The method of claim 1, wherein in the step (c), portions of the resin film are separated by each of the separators, and the separated portions of the resin film are aligned respectively with the gasket elements installed around the polarized electrodes.

* * * * *